United States Patent
Agthe et al.

(10) Patent No.: US 9,723,318 B2
(45) Date of Patent: Aug. 1, 2017

(54) COMPRESSION AND DECOMPRESSION OF REFERENCE IMAGES IN A VIDEO ENCODER

(75) Inventors: Bernhard Agthe, Feldkirchen (DE); Peter Amon, München (DE); Gero Bäse, München (DE); Andreas Hutter, München (DE); Robert Kutka, Geltendorf (DE); Norbert Oertel, Landshut (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 368 days.

(21) Appl. No.: 13/979,497

(22) PCT Filed: Jan. 12, 2012

(86) PCT No.: PCT/EP2012/050435
§ 371 (c)(1),
(2), (4) Date: Jul. 12, 2013

(87) PCT Pub. No.: WO2012/095490
PCT Pub. Date: Jul. 19, 2012

(65) Prior Publication Data
US 2013/0301711 A1    Nov. 14, 2013

(30) Foreign Application Priority Data
Jan. 12, 2011    (EP) .................... 11150714

(51) Int. Cl.
*H04N 7/12*    (2006.01)
*H04N 11/02*    (2006.01)
(Continued)

(52) U.S. Cl.
CPC ......... *H04N 19/423* (2014.11); *H04N 19/117* (2014.11); *H04N 19/124* (2014.11);
(Continued)

(58) Field of Classification Search
CPC ......... H04N 19/00066; H04N 19/0009; H04N 19/00484; H04N 19/147; H04N 19/117;
(Continued)

(56) References Cited

U.S. PATENT DOCUMENTS 5,818,530 A * 10/1998 Canfield .................. G06T 1/60
348/400.1
5,933,195 A    8/1999 Florencio
(Continued)

FOREIGN PATENT DOCUMENTS

EP    1292154    3/2003
EP    1 765 021 A2    3/2007
(Continued)

OTHER PUBLICATIONS

German Translation of Office Action issued Aug. 11, 2014 for corresponding Japanese Patent Application No. 2013-548845.
(Continued)

*Primary Examiner* — Sath V Perungavoor
*Assistant Examiner* — Xiaolan Xu
(74) *Attorney, Agent, or Firm* — Slayden Grubert Beard PLLC (57) ABSTRACT

Methods and devices transform image data, which are transformed by a compression filter before being compressed and stored in a reference image memory. In an extension, an inverse transformation to that of the compression filter is performed by a decompression filter when image data from the reference memory are read out and decompressed. The methods and devices can be used for image compression methods and image decompression methods that use reference image memories.

9 Claims, 6 Drawing Sheets

(51) Int. Cl.

| | | |
|---|---|---|
| *H04N 11/04* | (2006.01) | |
| *H04N 19/423* | (2014.01) | |
| *H04N 19/159* | (2014.01) | |
| *H04N 19/147* | (2014.01) | |
| *H04N 19/46* | (2014.01) | |
| *H04N 19/117* | (2014.01) | |
| *H04N 19/124* | (2014.01) | |
| *H04N 19/426* | (2014.01) | |

(52) U.S. Cl.
CPC ......... *H04N 19/147* (2014.11); *H04N 19/159* (2014.11); *H04N 19/428* (2014.11); *H04N 19/46* (2014.11)

(58) Field of Classification Search
CPC .... H04N 19/423; H04N 19/159; H04N 19/46; H04N 19/124; H04N 19/428
See application file for complete search history.

(56) References Cited

U.S. PATENT DOCUMENTS

| | | | |
|---|---|---|---|
| 5,987,180 | A | 11/1999 | Reitmeier |
| 6,229,852 | B1 | 5/2001 | Hoang |
| 6,470,051 | B1 | 10/2002 | Campisano et al. |
| 8,437,394 | B2 | 5/2013 | Fu et al. |
| 2003/0002584 | A1 | 1/2003 | Campisano et al. |
| 2003/0053709 | A1* | 3/2003 | Olivieri ................ H04N 19/147 382/261 |
| 2009/0141992 | A1 | 6/2009 | Coulombe et al. |
| 2009/0290637 | A1* | 11/2009 | Lai ........................ H04N 19/597 375/240.02 |
| 2010/0074330 | A1 | 3/2010 | Fu et al. |
| 2010/0098169 | A1 | 4/2010 | Budagavi |
| 2011/0026593 | A1* | 2/2011 | New ...................... H03M 7/42 375/240.12 |

FOREIGN PATENT DOCUMENTS

| | | | |
|---|---|---|---|
| EP | 1 985 123 A2 | 10/2008 | |
| EP | 2250815 | 11/2010 | |
| EP | 11150714.1 | 1/2011 | |
| JP | 6-311506 | 11/1994 | |
| JP | 10-66081 | 3/1998 | |
| JP | 2000-165875 | 6/2000 | |
| JP | WO 2010092740 A1 * | 8/2010 | .............. H03M 7/42 |
| JP | 2012-503902 | 2/2012 | |
| WO | 2007/087640 A2 | 8/2007 | |
| WO | WO 2007/114368 A1 | 10/2007 | |
| WO | WO 2007/148619 A1 | 12/2007 | |
| WO | 2009/055898 | 5/2009 | |
| WO | 2009/098315 | 8/2009 | |
| WO | WO 2010/034205 A1 | 4/2010 | |
| WO | WO 2010/092740 A1 | 8/2010 | |
| WO | WO 2010/137322 A1 | 12/2010 | |
| WO | PCT/EP2012/050435 | 1/2012 | |

OTHER PUBLICATIONS

Office Action dated Jan. 13, 2015 in corresponding Japanese Patent Application No. 2013-548845.

Peter List et al., Adaptive Deblocking Filter, IEEE Transactions on Circuits and Systems for Video Technology, vol. 13, No. 7, Jul. 2003, pp. 614-619.

Takeshi Chujoh et al., Internal bit depth increase except frame memory, ITU-Telecommunications Standardization Sector, Study Group 16 Question 6, Video Coding Experts Group (VCEG), $32^{nd}$ Meeting, Apr. 20-21, 2007, pp. 1-4.

JCT-VC: Test Model under Consideration, Joint Collaborative Team on Video Coding (JCT-VC), $1^{st}$ Meeting, Apr. 15-23, 2010, URL: http://wftp3.itu.int/av-arch/jctvc-site/; 153 pages.

European Office Action for related European Patent Application No. 12705230.6, issued May 29, 2015, 9 pages.

Chong Soon Lim, "Reference Frame Compression Using Image Coder", ISO/IEC Document: JCTVC-B103, Joint Collaborative Team on Video Coding, 2nd Meeting: Geneva, CH, Jul. 21-27, 2010, 44 pages.

Mehmet Umut Demircin et al., "Compressed Reference Frame Buffers (CRFB)", ISO/IEC Document: JCTVC-B089, Joint Collaborative Team on Video Coding, 2nd Meeting: Geneva, CH, Jul. 21-28, 2010, 9 pages.

Madhukar Budagavi et al., "ALF memory compression and IBDI/ALF coding efficiency test results in TMuC-0.1", ISO/IEC, Document: JCTVC-B090, Joint Collaborative Team on Video Coding, 2nd Meeting: Geneva, CH, Jul. 21-28, 2010, 5 pages.

Hirofumi Aoki et al., "DPCM-based memory compression on TE2", ISO/IEC Document: JCTVC-B057, Joint Collaborative Team on Video Coding, 2nd Meeting: Geneva, CH, Jul. 21-28, 2010, 19 pages.

Alfred M. Bruckstein et al., "Down-Scaling for Better Transform Compression", IEEE Transactions on Image Processing, IEEE Service Center, Piscataway, NJ, US, vol. 12, No. 9, Sep. 1, 2003, pp. 1132-1144.

English Language International Search Report for PCT/EP2012/050435, mailed on Apr. 11, 2013, 4 pages.

Chinese Office Action, Application No. 801280005268.3, 11 pp. 03-27-17.

* cited by examiner

COMPRESSION AND DECOMPRESSION OF REFERENCE IMAGES IN A VIDEO ENCODER

CROSS REFERENCE TO RELATED APPLICATIONS

This application is based on and hereby claims priority to International Application No. PCT/EP2012/050435 filed on Jan. 12, 2012 and European Application No. 11150714.1 filed on Jan. 12, 2011, the contents of which are hereby incorporated by reference.

BACKGROUND

The invention relates to methods and devices for transforming first frame data.

Over the years, frame formats to be encoded have become increasingly large due, for example, to the introduction of new types of recording systems, including the current changeover from a PAL (Phase Alternating Line) TV transmission system used in Europe over the last 50 years, having a 625×576 pixel frame size, to a 1920×1080 or 1280×720 pixel HDTV (High Definition Television) resolution. In the future, even larger frame formats are expected to be introduced in new types of TV systems.

HDTV and future systems use digital compression methods to compress a sequence of video frames so that they can be transmitted over the Internet or mobile communications channels for example. However, due to the increased frame format sizes, the computing power required for compressing the sequence of video data and the amount of memory required here are increasing significantly. One consequence of this is that data transfer between memory and processing units which implement the compression methods is also increasing significantly.

Therefore study groups such as the Joint Collaborative Team on Video Coding (JCT-VC), a common working party of the ITU and ISO/IEC (ITU—International Telecommunication Union, ISO—International Standardization Organisation, IEC—International Electrotechnical Commission) are working not only on improving the compression rate, but also on standardized methods for enabling video frames to be efficiently stored in reference frame buffers of the respective codec and accessed in a resource-saving manner.

Figure 1:
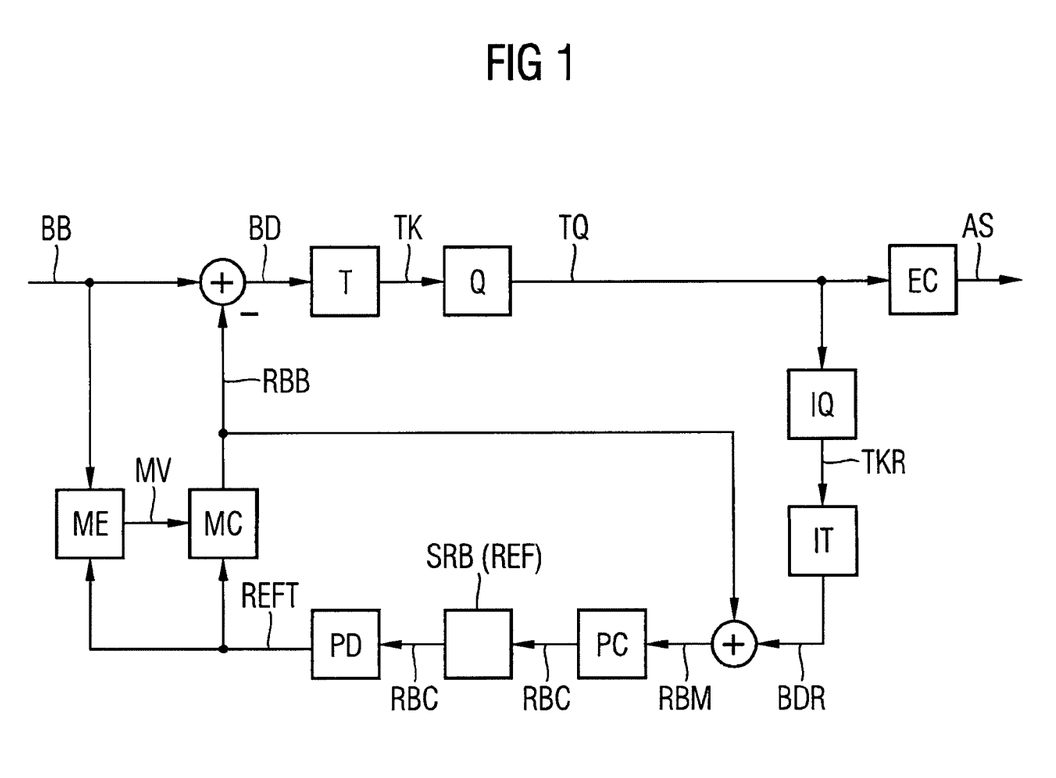
FIG. 1 shows a related art encoder for compressing frame data.

FIG. 1 shows a known device for compressing a sequence of frames, comprising a reference frame buffer SRB. Frames are encoded, for example, using predictive coding, also know as inter-frame coding. One of the frames is divided into frame blocks BB, e.g. of 16×16 pixels, and is then encoded frame block by frame block. Then for one of the frame blocks a reference frame block RBB providing a good basis for estimating the content of the frame block is searched for in a reference frame REF. For this purpose the frame block is transferred to a motion estimation unit ME which, on the basis of a reference sub-frame REFT comprising parts of the reference frame REF after frame decompression by a frame decompression unit PD, selects the reference frame block from the reference sub-frame and signals the selected reference frame block to a motion compensation unit MC by a motion vector MV. The motion compensation unit provides the reference frame block on the basis of the reference frame and motion vector.

In a next step, a difference frame block BD is generated by subtracting the reference frame block RBB from the frame block BB. The difference frame block subsequently undergoes transformation in a transformation unit T, e.g. using a discrete cosine transform method. Available at the output of the transformation unit are transform coefficients TK which are then fed to a quantization unit Q for quantization. Available at the output of the quantization unit are quantized transform coefficients TQ which are converted into an output signal AS by entropy encoding performed by an entropy encoding unit EC.

In a feedback loop, the quantized transform coefficients TQ are converted into reconstructed transform coefficients TKR by inverse quantization by an inverse quantization unit IQ. These reconstructed transform coefficients TKR are transformed into a reconstructed difference frame block BDR by inverse transformation by an inverse transformation unit IT. In a further step, a reconstructed frame block RBM is generated by adding the reconstructed difference frame block BDR and the reference frame block RBB.

In older encoding methods, the reconstructed frame block is written directly to the reference frame buffer. In methods currently in standardization, to reduce a data volume the reconstructed frame block first undergoes frame compression by a frame compression unit PC which significantly reduces the data volume of the reconstructed frame block. A compressed reconstructed frame block RBC produced by the frame compression unit PC is then stored in the reference frame buffer. In order to enable the motion estimation unit and the motion compensation unit to access the required frame data, when a reference frame REF or rather a specific section of the reference frame is requested, the respective compressed reconstructed frame block is read out from the reference frame buffer SRB and converted into a reference sub-frame REFT by frame decompression by a frame decompression unit PD.

Figure 2:
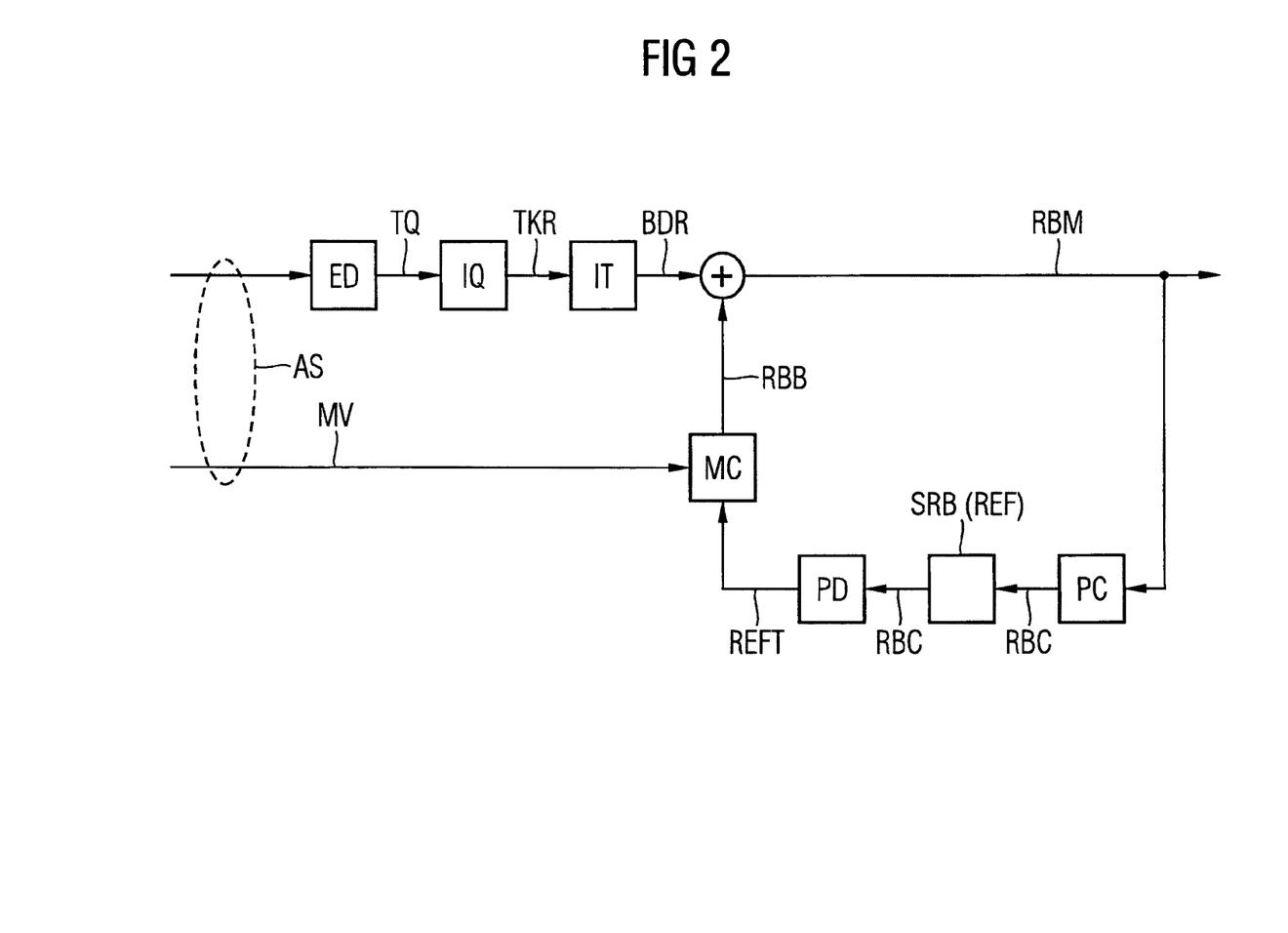
FIG. 2 shows a related art decoder for decompressing compressed frame data.

FIG. 2 shows a decoder corresponding to the encoder shown in FIG. 1. The output signal AS is decoded into quantized transform coefficients TQ by an entropy decoding unit ED. In addition, the quantized transform coefficients are inversely quantized into reconstructed transform coefficients TKR by the inverse transformation unit IQ. This is followed by inverse transformation of the reconstructed transform coefficients TKR into a reconstructed difference frame block BDR by the inverse information unit IT. In addition to the output signal, the respective motion vector MV, among other things, is also transmitted to the decoder. Using the reference sub-frame REFT, the decoder can determine therefrom, by the motion compensation unit MC, the reference frame block RBB which is converted into the reconstructed frame block RBM by adding it to the reconstructed difference frame block.

The reconstructed frame block RBM can be reproduced on a display, for example. The reconstructed frame block RBM is then converted by compression by the frame compression unit PC into the compressed reconstructed frame block RBC which is then stored in the reference frame buffer SRB. The compressed reconstructed frame blocks stored in the reference frame buffer can be decompressed into the reference sub-frame by the frame decompression unit PD.

The article by Chong Soon Lim ("Reference Frame Compression using Image Coder," 2010) describes a lossless frame compression/decompression method in which bit-plane coding is carried out after floating point discrete cosine transformation (DCT) and scanning of coefficients in a one-dimensional representation, arranged two-dimensionally after the transformation.

In a method according to Mehmet Umut Demircin et al. ("Compressed Reference Frame Buffers [CRFB]," 2010), a buffer access bandwidth reduction technique is proposed. In addition to transformation and quantization, DC prediction and entropy encoding for the frame compression unit PC and/or a reverse step for the frame decompression unit PD are also proposed.

Madhukar Budagavi (ALF Memory Compression and IBDI/ALF coding efficiency test results in TMuC-0.1," 2010) describes test results for compression and decompression of frame data upstream and downstream respectively of a deblocking frame memory.

Lastly, Hirofumi Aoki ("DPCM-Based Memory Compression," 2010) describes a one-dimensional DPCM-based frame memory compression method (DPCM—discrete pulse code modulation).

At least the compression methods proposed by Lim and Aoki are lossless.

SUMMARY

One potential object is to specify methods and devices with which compression and decompression by the frame compression unit and frame decompression unit respectively can be increased compared to the related art.

The inventors propose a method for transforming first frame data which, having been compressed by a frame compression unit, is stored in a reference frame buffer and, on retrieval from the reference frame buffer, is decompressed into second frame data by a frame decompression unit, wherein prior to compression the frame data is transformed by a compression filter such that an increase in the frame compression unit's compression rate is produced.

In existing coding methods the frame compression unit often operates losslessly. By using the compression filter, loss of image detail can be controlled by a filter parameter of the compression filter without interaction with the frame compression unit. It is also advantageous that the compression filter design can be individually adapted to the characteristics of the frame compression unit.

The compression filter is preferably generated as a function of at least one of the following parameters:
 a coding mode used for encoding the first frame data;
 a quantization parameter used for encoding the first frame data;
 a motion vector used for predictive coding of the first frame data Controlling the compression filter as a function of at least one of the above mentioned parameters enables improved compression to be achieved, as it enables specific characteristics of the first frame data to be controlled, such as a specific coding mode, a quantization parameter used or a motion vector employed.

In an advantageous development, the compression filter takes the form of a subband filter, in particular with suppression of quantization noise present in the first frame data as a result of quantization. This enables compression by the frame compression unit to be improved in that image content which can only be encoded with great complexity, such as sharp-edged lines, and "useless" image content such as quantization noise, are filtered and can therefore be compressed more efficiently.

The compression filter is advantageously determined from a range of a plurality of options such that the filter which optimizes an error function for a specifiable data rate of the first frame data, i.e. minimizing the error by compression using the compression error at a fixed data rate, is selected. Only the compression filter which achieves a very good image quality at a specifiable data rate is thereby selected. Similarly, this development can also be implemented such that the filter producing the lowest data rate without quality impairment is selected.

The second frame data is preferably generated such that frame data decoded after decompression by the decompression unit is subject to a decompression filter, wherein reverse steps to the compression filter are carried out by the decompression filter.

This development enables compression filters to be used which only reduce the sharpness of the first frame data. For this purpose, the second frame data is generated such that frames decoded after decompression by the frame decompression unit are subject to a decompression filter, wherein the compression filter and the decompression filter perform at least one of the following operations:
 a first number of pixels of the first frame data is reduced by the compression filter and a second number of pixels of the second frame data is increased by the decompression filter such that the first number and the second number assume an identical value;
 a third number of bit planes of the pixels of the first frame data is reduced by the compression filter and a fourth number of bit planes of the pixels of the second frame data is increased by the decompression filter such that the third number and the fourth number assume an identical value.

This enhancement enables the first frame data to be transformed particularly efficiently, so that compression can be performed extremely efficiently by the frame compression unit.

The inventors also propose devices for transforming first frame data which, having been compressed by a frame compression unit, is stored in a reference frame buffer and is decompressed into second frame data by a frame decompression unit on retrieval from the reference frame buffer, wherein the device has a compression filter for transforming the frame data, the filter transforming the first frame data prior to compression so as to produce a compression rate increase in the frame compression unit. Advantages of these devices correspond with those of the method.

The device is preferably supplemented by a decompression filter for generating the second frame data such that frame data decoded after decompression has been performed by the frame decompression unit is subject to the decompression filter, the decompression filter operating inversely to the compression filter. Advantages of this enhancement are set forth in this document with regard to the corresponding method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Elements having an identical function and mode of operation are provided with the same reference characters in the figures.

FIGS. 1 and 2 show a frame compression unit PC and frame decompression unit PD used according to the related art. As FIGS. 1 and 2 have been explained in detail in the introduction, reference is made here to the remarks in the introduction.

Figure 3:
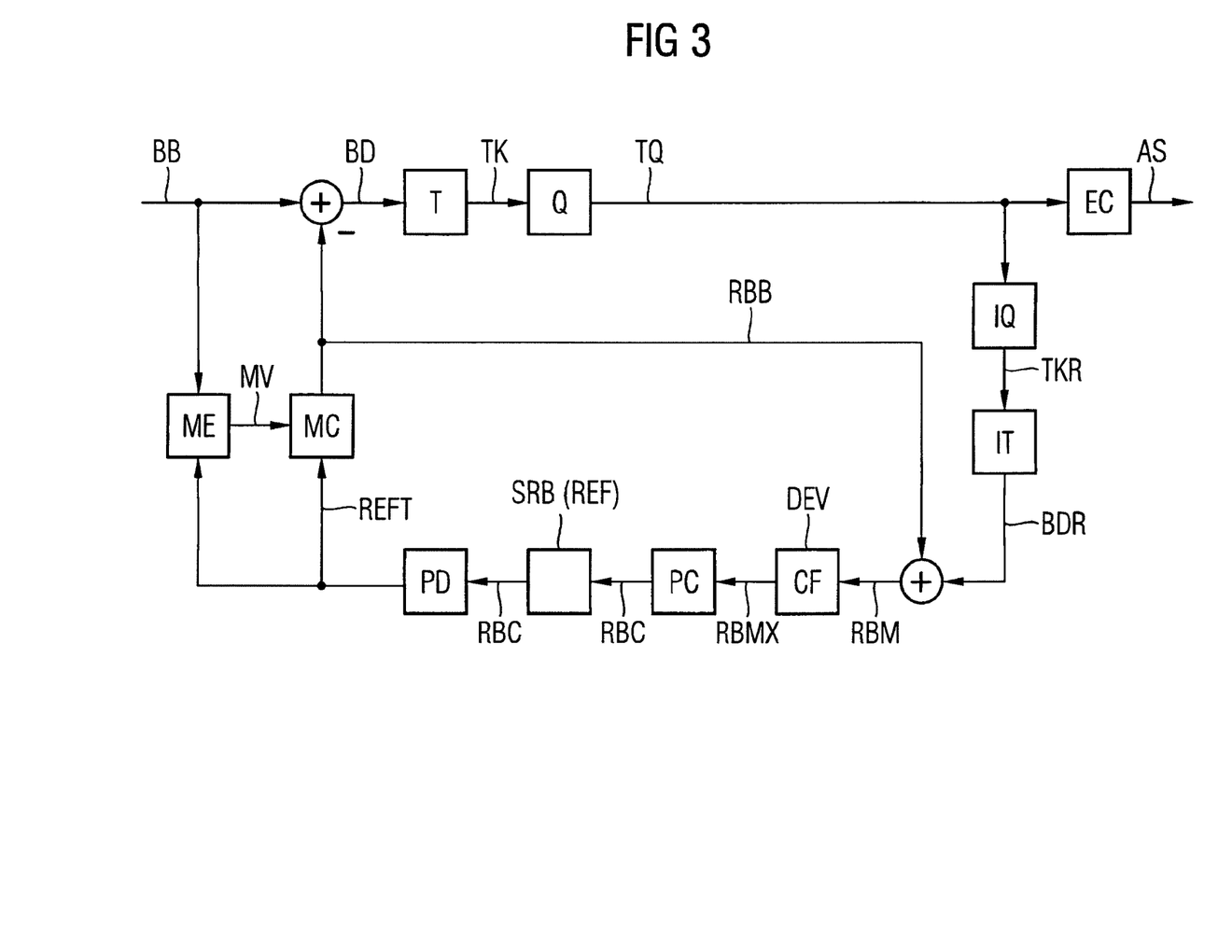
FIG. 3 shows a first modified encoder representing a first variant of the inventors' proposals.

FIG. 3 shows a first exemplary embodiment of a transforming method, the FIG. 3 likewise representing a device DEV for carrying out this method. FIG. 3 differs from FIG. 1 in that a compression filter CF is incorporated in the signal processing chain immediately upstream of the frame compression unit PC. The reconstructed frame block RBM, also termed the first frame data, is fed to the compression filter CF for transformation, i.e. filtering. After transformation has been performed, the first frame data RBM is present at the output of the compression filter CF as modified first frame data RBMX. This modified first frame data is then fed to the frame compression unit PC to compress the modified first frame data into the compressed reconstructed frame block RBC, the compressed reconstructed frame block RBC finally being stored in the reference frame buffer SRB. To read out and process the data in the reference frame buffer, the respective compressed reconstructed frame block RBC is fed to the frame decompression unit PD which generates therefrom by decompression the reference sub-frame REFT, hereinafter also referred to as second frame data. The subsequent method in FIG. 3 is similar to that of FIG. 1 and will not therefore be described in further detail here.

Figure 4:
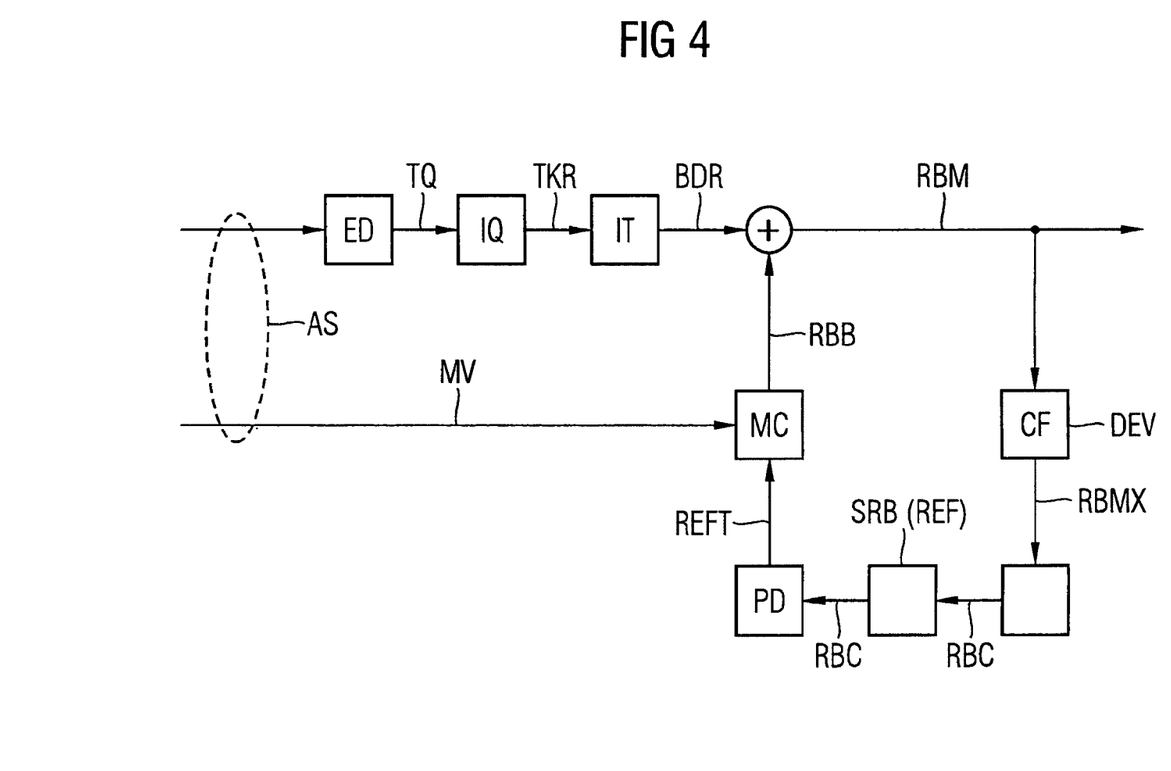
FIG. 4 shows a first modified decoder representing the first variant of the inventors' proposals.

FIG. 4 shows the use of the proposals on a decoder or more specifically as part of a decoding method, wherein the setup according to FIG. 4 is identical to the setup according to FIG. 2 apart from one modification. In contrast to FIG. 2, in FIG. 4 the compression filter CF is connected into the signal processing directly upstream of the frame compression unit PC in the feedback loop. Modified first frame data RBMX is produced from the first frame data RBM by using the compression filter CF. The further steps are similar to those described in connection with FIGS. 2 and 3.

To ensure that the encoder in FIG. 3 and the decoder in FIG. 4 operate without drift, the respective compression filter CF shown is identical in both versions.

The compression filter CF is configured such that, prior to compression by the frame compression unit, it transforms the first frame data such that an increased compression rate can be produced in the subsequent processing step of the frame compression unit. In an exemplary embodiment of the compression filter CF, the latter is designed such that image details can be reduced in a controlled manner by a compression filter parameter. The compression filter can be implemented in the form of a low-pass filter for which the cutoff frequency can be set using the filter parameter and which, by its filter characteristic, filters out high-frequency components in the first frame data. Filtering out the high-frequency frame components enables the frame compression unit to compress the modified first frame data with a higher compression rate than according to the related art. In an alternative development, the compression filter CF is designed in the form of a subband filter which performs the transformation of the first frame data, in particular with suppression of quantization noise contained in the first frame data as the result of quantization.

Figure 5:
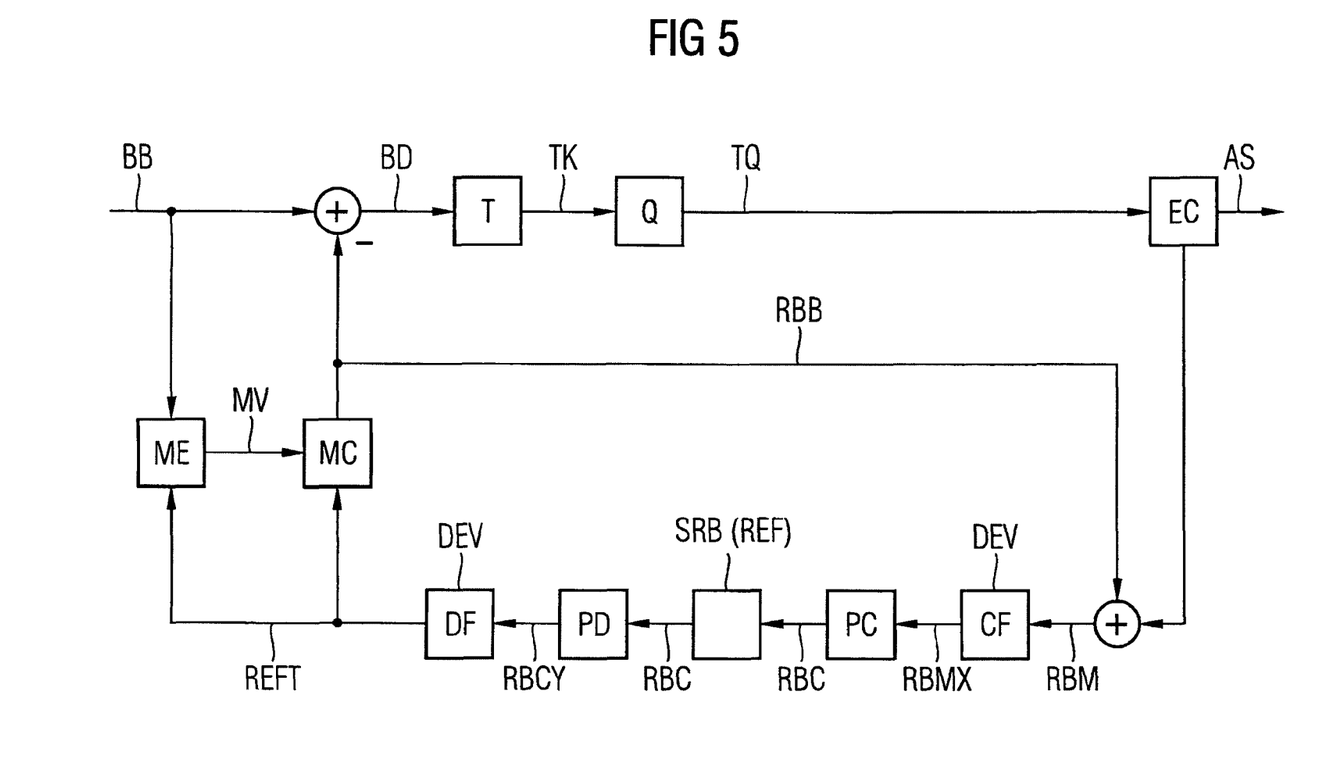
FIG. 5 shows a second encoder representing a second variant of the inventors' proposals.
Figure 6:
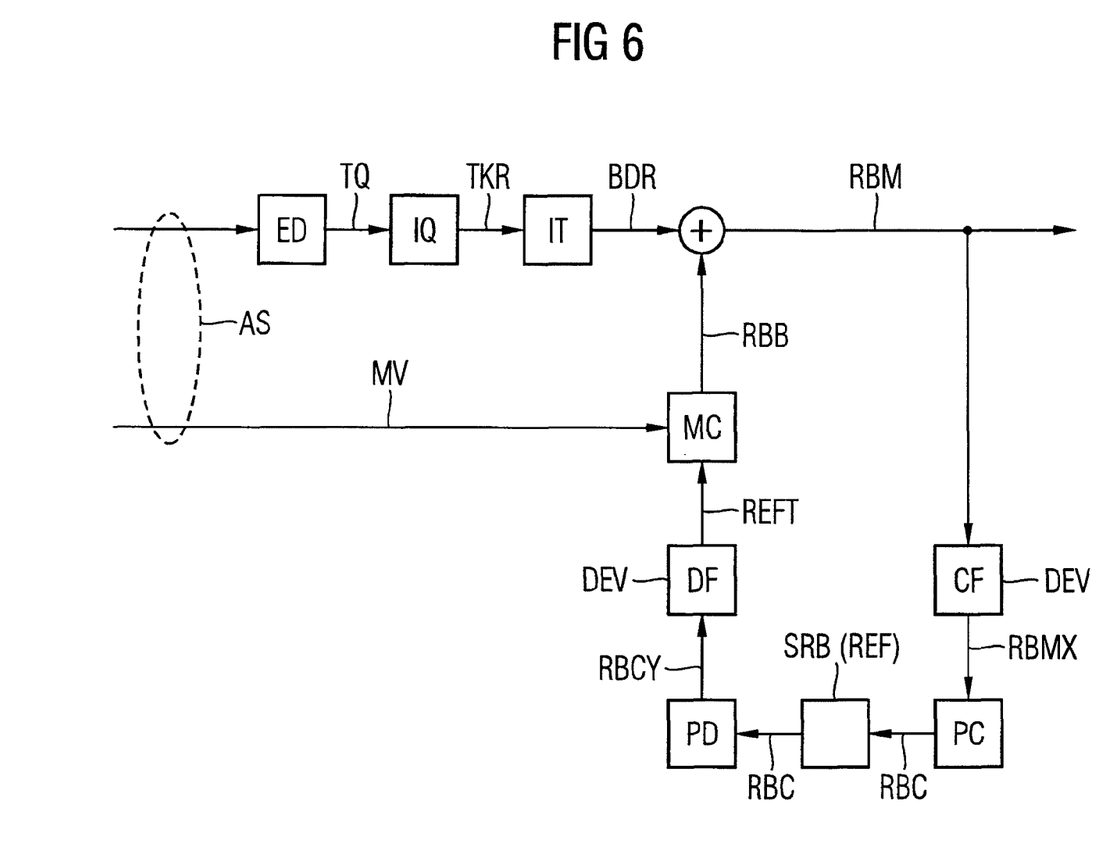
FIG. 6 shows a second decoder representing the second variant of the inventors' proposals.

In addition to changing the image sharpness or rather image details within the first frame data, wherein the number of pixels of the first frame data and of the modified first frame data are identical, format reduction can also be initiated, as will now be carried out in FIGS. 5 and 6, i.e. a reduction in the number of pixels by the compression filter.

To this end, FIG. 5 shows, in the feedback loop, signal processing of the first frame data RBM by the compression filter CF, the frame compression unit PC and storage in the reference frame buffer SRB as already explained in detail in FIG. 3. The difference with respect to FIG. 3 is now that, when the second frame data is retrieved, a respective compressed reconstructed frame block RBC is first read out of the reference frame buffer, and converted by the frame decompression unit PD into modified second frame data RBCY and by inverse transformation of the modified second frame data into the reference sub-frame REFT by a decompression filter DF. For example, the compression filter CF reduces a frame size of 100×100 pixels of the first frame data to a frame size of 50×50 pixels of the modified first frame data. This pixel reduction is performed, for example, by a 2×2 filter which multiples an amplitude value of each of the four points taken into account by a weight of 0.25 and totals the resulting weighted amplitude values. This produces from 2×2 pixels a new pixel of the modified first frame data. The decompression filter produces 100×100 pixels from 50×50 pixels, e.g. by copying a pixel to each position of 2×2 pixels of the reconstructed pixel. Further methods for reducing and increasing the format will be known to an average person skilled in the art of image signal processing and will not therefore be discussed in greater detail here.

FIG. 6 shows the variant of FIG. 5 with reference to a decoder. The mode of operation of the variant is similar to that explained in connection with FIG. 5.

In another embodiment of the compression and decompression filter, the amplitude values of the pixels are reduced, e.g. by quantization, or increased, e.g. by inverse quantization.

In a particular design variant, the pair of compression and decompression filters operate losslessly, i.e. compression filter (CF) ⊗ decompression filter (DF)=1, i.e. this linking produces a unity matrix, wherein the symbol ⊗ corresponds to a convolution or a product.

In addition to the previous examples, the compression filter and possibly the decompression filter can be present in a plurality of design variants. For example, 5 low-pass filters with different cutoff frequencies can be available for selection. Prior to using one of the design variants of the compression filter, it is first determined for each variant of the compression filter the compression rate versus image quality tradeoff thereby produced by the respective compression filter and the frame compression unit. For this purpose the associated cost value is determined for each variant using a cost function. When the cost values for all the variants of the compression filter are available, the variant which achieves the lowest cost value is selected.

The respective device and method shown in the FIGS. 1-6, represented by the respective squares, can be realized in software, hardware or a combination of software and hardware. Thus they can be stored in program code in a program memory and read out and processed by a processor connected to the program memory and an interface for transmitting and receiving data such as the frame block or the output signal.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for transforming a reconstructed frame block, comprising:
    providing the reconstructed frame block by decoding a coded frame block;
    transforming the reconstructed frame block with a compression filter to thereby increase a compression rate of a frame compression unit, wherein the compression filter transforms the reconstructed frame block as a function of at least one of the following parameters:
        a quantization parameter used for coding of the coded frame block; or
        a motion vector used for predictive coding of the coded frame block;
    compressing the transformed reconstructed frame block by a frame compression unit to a transformed, compressed reconstructed frame block;
    storing the transformed, compressed reconstructed frame block in a reference buffer;
    retrieving the transformed, compressed reconstructed frame block from the reference buffer;
    decompressing the transformed, compressed reconstructed frame block by a frame decompression unit to generate a decompressed reconstructed frame block; and
    selecting a reference frame block, using a motion compensation unit, based on the decompressed reconstructed frame block for decoding a subsequent coded image.

2. The method as claimed in claim 1, wherein
    the compression filter comprises a subband filter, which suppresses quantization noise contained in the reconstructed frame block as a result of quantization.

3. The method as claimed in claim 1, wherein the compression filter optimizes a rate distortion function at a predefinable data rate.

4. The method as claimed in claim 1, further comprising:
    comparing a plurality of filters;
    determining which of the plurality of filters best optimizes a rate distortion function at a predefinable data rate; and
    for the compression filter, selecting the filter which best optimizes the rate distortion function.

5. The method as claimed in claim 1, wherein decompressing the first frame data comprises:
    subjecting the decompressed reconstructed frame block to a decompression filter that transforms a decoded frame data using a reverse process of the compression filter.

6. The method as claimed in claim 1, comprising:
    after decompressing the transformed, compressed reconstructed frame block to generate the decompressed reconstructed frame block, subjecting a decoded frame data to a decompression filter to generate a de-transformed, decompressed reconstructed frame block, and wherein the compression filter and the decompression filter execute at least one of the following operations:
        a first number of pixels is reduced by the compression filter and a second number of pixels is increased by the decompression filter such that the first number and the second number assume an identical value; and
        a third number of bit planes of the pixels is reduced by the compression filter and a fourth number of bit planes of the pixels is increased by the decompression filter such that the third number and the fourth number assume an identical value.

7. A device to transform a reconstructed frame block provided by decoding a coded frame block, the device comprising:
    a compression filter configured to transform the reconstructed frame block prior to compression, to thereby increase a compression rate of a frame compression unit, wherein the compression filter transforms the reconstructed frame block as a function of at least one of the following parameters:
        a quantization parameter used for coding of the coded frame block; or
        a motion vector used for predictive coding of the coded frame block;
    a frame compression unit configured to compressing the transformed reconstructed frame block to a transformed, compressed reconstructed frame block;
    a reference buffer configured to store the transformed, compressed reconstructed frame block; and
    a frame decompression unit configured to decompress the transformed, compressed reconstructed frame block, after retrieval of the transformed, compressed reconstructed frame block from the reference buffer, to generate a decompressed reconstructed frame block; and
    a motion compensation unit configured to select a reference frame block based on the decompressed reconstructed frame block for decoding a subsequent coded image.

8. The device as claimed in claim 7, wherein
    the device further comprises a decompression filter to subject the decompressed reconstructed frame block to decompression filtering that transforms a decoded frame data using a reverse process of the compression filter.

9. A method for transforming a frame block, comprising:
    receiving a reference frame block from a motion compensation unit via a first feedback loop;
    receiving a reconstructed difference frame via a second feedback loop that is partially overlapping and partially distinct from the first feedback loop and including at least one of an inverse quantization unit and inverse transformation unit;
    adding the reference frame block to the reconstructed difference frame block to provide a reconstructed frame block;
    transforming the reconstructed frame block with a compression filter arranged in the overlapping portion of the first and second feedback loops, wherein the compression filter transforms the reconstructed frame block as a function of at least one of the following parameters:
        a quantization parameter used for coding of the coded frame block; or
        a motion vector used for predictive coding of the coded frame block;

compressing the transformed reconstructed frame block by a frame compression unit arranged in the overlapping portion of the first and second feedback loops;

storing the transformed, compressed reconstructed frame block in a reference frame buffer;

retrieving the transformed, compressed reconstructed frame block from the reference frame buffer;

decompressing the transformed, compressed reconstructed frame block by a frame decompression unit to generate a decompressed reconstructed frame block;

selecting a reference frame block, using the motion compensation unit, based on a reference frame and a motion vector; and feeding the selected reference frame block via both the first and second feedback loops.

\* \* \* \* \*